United States Patent [19]

Ray et al.

[11] Patent Number: 5,764,231

[45] Date of Patent: Jun. 9, 1998

[54] METHOD AND APPARATUS FOR CREATING GEOMETRIC DEPTH IMAGES USING COMPUTER GRAPHICS

[75] Inventors: Lawrence A. Ray; Richard N. Ellson, both of Rochester, N.Y.

[73] Assignee: Eastman Kodak Company, Rochester, N.Y.

[21] Appl. No.: 884,001

[22] Filed: May 15, 1992

[51] Int. Cl.[6] .................................................. G06T 17/00
[52] U.S. Cl. .................................................................. 345/419
[58] Field of Search ........................ 395/119–122, 125, 395/127, 133–139, 155, 161; 354/110–115; 355/22; 345/419–422, 425, 427, 433–439

[56] References Cited

U.S. PATENT DOCUMENTS

| | | | |
|---|---|---|---|
| Re. 35,029 | 8/1995 | Sandor et al. | 355/22 |
| 4,164,748 | 8/1979 | Nagata | 358/3 |
| 4,463,380 | 7/1984 | Hooks, Jr. | 358/160 |
| 4,506,296 | 3/1985 | Marraud et al. | 348/59 |
| 4,552,442 | 11/1985 | Street | 354/112 |
| 4,552,853 | 11/1985 | Kawabata et al. | 501/134 |
| 4,625,290 | 11/1986 | White | 395/119 |
| 4,674,853 | 6/1987 | Street | 354/112 |
| 4,724,449 | 2/1988 | Wright | 354/112 |
| 4,757,350 | 7/1988 | Street | 355/22 |
| 4,853,769 | 8/1989 | Kollin | 358/88 |
| 4,870,600 | 9/1989 | Hiraoka | 364/522 |
| 4,872,750 | 10/1989 | Morishita | 353/7 |
| 4,875,034 | 10/1989 | Brokenshire | 340/721 |
| 4,896,210 | 1/1990 | Brokenshire et al. | 358/88 |
| 4,903,069 | 2/1990 | Lam | 355/22 |
| 4,945,407 | 7/1990 | Winnek | 358/88 |
| 4,956,705 | 9/1990 | Wright | 358/88 |
| 4,959,641 | 9/1990 | Bass et al. | 340/700 |
| 4,965,753 | 10/1990 | Kraemer | 364/522 |
| 4,987,487 | 1/1991 | Ichinose et al. | 358/92 |
| 5,005,217 | 4/1991 | Bern et al. | 2/104 |
| 5,014,126 | 5/1991 | Pritchard et al. | 358/91 |
| 5,019,855 | 5/1991 | Lam | 355/22 |
| 5,025,400 | 6/1991 | Cook et al. | 364/522 |
| 5,028,950 | 7/1991 | Fritsch | 355/22 |

(List continued on next page.)

FOREIGN PATENT DOCUMENTS

| | | |
|---|---|---|
| 0520179 | 12/1992 | European Pat. Off. . |
| WO-A-9008343 | 7/1990 | WIPO . |
| WO90/00306 | 7/1990 | WIPO . |

OTHER PUBLICATIONS

*FKT FERNSEH–UND KINO TECHNIK, "Autostereoskopische 3D–Systeme mit Zwischenbildern in Linsenrastergrossbildschirmen" by Borner, vol. 44, No. 10, 1990, Heidelberg, Germany, pp. 556–564.

SPIE Conference On Three–Dimensional Visualization And Display Technologies, vol. 1083, Jan., 1989, Los Angeles, pp. 102–107, Love et al., "Computer Generated Lenticular Stereograms".

IBM Technical Disclosure Bulletin, vol. 15, No. 3, Aug., 1972, New York, pp. 834–839A, Appel et al, "Computer Generation of 3D Pictures".

"Computer Generated Lenticular Stereograms" by Shaun Love and David F. McAllister, *Three–Dimensional Visualization and Display Technologies*, 1988, vol. 1083.

"Electronically Interpolated Integral Photography System" U.S. application serial no. 07/722,713.

*Primary Examiner*—Almis R. Jankus
*Attorney, Agent, or Firm*—Edward Dugas

[57] ABSTRACT

A method and apparatus in which a geometric graphic image of an object to be rendered as a depth image is created. The viewpoint of the viewer of the depth image is determined by the user. Once the viewpoint is determined the number of views is automatically determined along with the spacing between or positions of the views. The system adjusts the aspect ratio of each view and rotates the object prior to rendering. The rendered views are then stored as electronic interleaved images which are used to produce a depth image, such as a lenticular print.

18 Claims, 4 Drawing Sheets

U.S. PATENT DOCUMENTS

| | | | |
|---|---|---|---|
| 5,036,356 | 7/1991 | Lo | 355/77 |
| 5,036,385 | 7/1991 | Eichenlaub | 358/3 |
| 5,060,172 | 10/1991 | Engelse et al. | 364/522 |
| 5,063,441 | 11/1991 | Lipton et al. | 358/88 |
| 5,065,236 | 11/1991 | Diner | 358/88 |
| 5,083,199 | 1/1992 | Börner | 358/88 |
| 5,088,054 | 2/1992 | Paris, II | 395/121 |
| 5,113,213 | 5/1992 | Sandor et al. | 355/22 |

METHOD AND APPARATUS FOR CREATING GEOMETRIC DEPTH IMAGES USING COMPUTER GRAPHICS

CROSS REFERENCES TO RELATED APPLICATIONS

This application is related to U.S. Application entitled Electronically Interpolated Integral Photography System having U.S. Ser. No. 08/195,231, now U.S. Pat. No. 5,455,689 which is a continuation of 07/722,713 now abandoned and Kodak Docket No. 61,496 and entitled Method And Apparatus For Graphically Generating Images Of Arbitrary Size having U.S. Ser. No. 07/885,705 now U.S. Pat. No. 5,276,478 and Kodak Docket No. 64,707 all assigned to Eastman Kodak Co. and incorporated by reference herein.

BACKGROUND OF THE INVENTION

1. Field of the Invention

The present invention is directed to a method and apparatus for graphically creating geometric depth images and, more particularly, to creating a geometric model of an object graphically, producing views of that object automatically and creating a depth image, lenticular type hardcopy print of the depth object.

2. Description of the Related Art

Producing images that have the perception of depth has traditionally been accomplished by photographic methods. Integral and lenticular photography have a long history of theoretical consideration and demonstration, but have only met with limited commercial success. Many of the elementary concepts supporting integral and lenticular photography have been known for many years (see Takanori Okoshi, Three-Dimensional Imaging Techniques, Academic Press, New York, 1976; and G. Lippman, "E'preuves re'versibles, Photographics integrales," Comptes Rendus, 146, 446–451, Mar. 2, 1908). The term integral photography refers to the composition of the overall image as an integration of a large number of microscopically small photographic image components. Each photographic image component is viewed through a separate small lens usually formed as part of a mosaic of identical spherically-curved surfaces embossed or otherwise formed onto the front surface of a plastic sheet of appropriate thickness. This sheet is subsequently bonded or held in close contact with the emulsion layer containing the photographic image components. Lenticular photography could be considered a special case of integral photography where the small lenses are formed as sections of cylinders running the full extent of the print area in the vertical direction. A recent commercial attempt at a form of lenticular photography is the Nimslo camera which is now being manufactured by a Hong Kong camera works and sold as a Nishika camera. A sense of depth is clearly visible, however, the resulting images have limited depth realism and appear to jump as the print is rocked or the viewer's vantage relative to the print is changed.

An optical method of making lenticular photographs is described by Okoshi. A photographic camera is affixed to a carriage on a slide rail which allows it to be translated in a horizontal direction normal to the direction of the desired scene. A series of pictures is taken wherein the camera is translated between subsequent exposures in equal increments from a central vantage point to later vantage points either side of the central vantage point. The distance that the lateral vantage points are displaced from the central vantage point is dependent on the maximum angle which the lenticular material can project photographic image components contained behind any given lenticule before it begins to project photographic image components contained behind an adjacent lenticule. It is not necessary to include a picture from the central vantage point, in which case the number of images will be even. If a picture from the central vantage point is included, the number of images will be odd. The sum of the total number of views contained between and including the lateral vantage points will determine the number of photographic components which eventually will be contained behind each lenticule.

The negatives resulting from each of these views are then placed in an enlarger equipped with a lens of the same focal length as the camera lens. Since the camera had been moved laterally between successive exposures as previously described, the positions of the images in the original scene will be seen to translate laterally across the film format. Consequently, the position of the enlarged images from the negatives also move laterally with respect to the center of the enlarger's easel as successive negatives are placed in the film gate. An assemblage consisting of a sheet of photographic material oriented with the emulsion in contact with the flat back side of a clear plastic sheet of appropriate thickness having lenticules embossed or otherwise formed into its other side, is placed on the enlarger easel with the lenticular side facing the enlarger lens. The position of this sheet on the easel is adjusted until the field of the central image is centered on the center of this assemblage, and an exposure of the information being projected out of the enlarger lens is made through the lenticules onto the photographic emulsion. Subsequently, negatives from the successive exposures are placed in the film gate and the position of this assemblage is readjusted on the easel to reposition each respective view to the center of the assemblage, and additional exposures of the information being projected from the enlarger lens are be made. When all the views contained between the lateral vantages have been similarly exposed on the emulsion through the lenticular plastic sheet, the film sheet can be separated from the lenticular plastic sheet and developed. If the aperture diameter of the enlarger lens is set to equal the amount of lateral shift between alternate views, the space behind each lenticule will be exactly filled with photographic image components. The final step in this process is to reassemble the photographic film and the plastic sheet again with intimate contact between the emulsion layer and the flat side of the lenticular plastic sheet and so positioned laterally so that the long strips of adjacent images resulting from exposures through the cylindrical lenticules are again positioned in a similar manner under the lenticules for viewing.

Ideally, an integral or lenticular photograph displays an infinite number of different angular views from each lenslet or lenticule. This is impossible since each angular view must have a corresponding small finite area of exposed emulsion or other hard copy media. Consequently, as an upper limit, the number of views must not exceed the resolution limit of the hard copy media. In the Nimslo print, the number of views behind each lens is limited to four views, two of which were considered left perspective views and the remaining two as right perspective views. This is well below the resolution limit of conventional photographic emulsions and allows for only two options of stereoscopic viewing perspective as the viewer's head moves laterally.

The optical multiple projection method was also utilized in many experiments by Eastman Kodak researchers and engineers in the 1960's and 1970's and produced a lenticular photo displayed on the front cover of the 1969 Annual Report to Stockholders. This print had a large number of cameras taking alternate views of the scene to provide a smooth transition of perspectives for each lens. It is possible that as many as 21 different angular views were present and the result is much more effective. This method of image recording is called an "indirect" technique because the final print recording is indirectly derived from a series of two-dimensional image recordings.

The concept of integral photography by this indirect optical technique is also described in U.S. Pat. Nos. 4,724,449 and 4,956,705 awarded to Douglas Wright and assigned to Dimensional Visions Group of Philadelphia, Pa. U.S. Pat. No. 4,724,449 describes a photographic camera with a laterally shifting film holder essentially similar to the techniques described by Okoshi to capture a number of perspectives of a scene and recording image information onto different negatives for eventual processing into three-dimensional prints. The method of providing a viewable print from the negatives so obtained is not described, but must be one providing for horizontal image separation only since only lateral camera motion is described. This suggests that either the lenticular means described above or through raster occlusion, such as using a Ronchi ruling on a faceplate spatially located in front of the composite print so as to prevent the images intended for viewing by the right eye to be seen by the left eye and vice versa, would be the mode of print display. A technique of raster occlusion to produce a print been also described intensively in textbooks (see L. Lipton, Foundations of the Stereoscopic Camera, Van Nostrand Reinhold, New York, 1978; and N. A. Valyus, Stereoscopy, Focal Press, London, 1962) and suffers from the additional problem of reduced image brightness. Wright's U.S. Pat. No. 4,956,705 describes the same image capture process using video CCD array cameras rather than photographic cameras and further discusses capturing the images using a "frame grabber" board in a computer which "freezes a frame of a still or moving object and digitizes the image for further processing."

Methods of optically recording scenes on lenticular print material so that the angular presentations of the lenslets corresponded correctly with the angular orientations of the original scene relied upon the "indirect" printing process until the disclosures of U.S. Pat. Nos. 4,552,853 and 4,674,853 by Graham S. B. Street of the United Kingdom taught a "direct" method of recording images with correct angular correlation. In this method, the converging bundle of optical rays from a very large aperture camera lens is directed onto a sheet of lenticular material to which photographic film has been affixed in the same manner as described in the projection method aforementioned.

The use of computer graphics to generate images to be used in conjunction with a lenticular overlay has been previously described, (see Shaun Love and David F. McAllister, "Computer Generated Lenticular Stereograms," SPIE Vol. 1083, Three-Dimensional Visualization and Display Technologies (1989)). PCT Application PCT/US90/00306 published Jul. 26, 1990 and corresponding to U.S. application Ser. No. 296,775, filed Jan. 13, 1989 entitled Computer Generated Autostereography Method And Apparatus by Sandin, Sandor, Cunnally and Meyers discusses creating images for barrier type autostereographics using a computer graphics system. The method described in this Sandin application uses a computer graphic system as an analog of a camera, i.e., the viewing conditions of the system have to be determined individually, and the output is captured as individual files which are post-processed. What is needed is a system that will handle such steps automatically with an efficient use of storage and computational resources.

SUMMARY OF THE INVENTION

It is an object of the present invention to produce a depth image from a geometric model.

It is another object of the present invention to automatically composite a plurality of images.

It is another object of the present invention to orient the computer graphics rendering system in a manner consistent with the depth imaging system.

It is another object of the present invention to provide a method of producing lenticular prints of graphically created objects.

It is a further object of the present invention to completely control all aspects of creating a depth image.

It is a further object of the present invention to allow imaginary objects to be rendered autostereoscopically.

The above objects can be attained by a method and apparatus in which a geometric graphic image or model of an object to be rendered as a depth image is created. The central viewpoint of the viewer of the depth image is selected and a central view is stored. Views surrounding this central view are automatically determined and stored using a number of views which the media can reproduce with a desired quality. The number of views is used to adjust the pixel aspect ratio for each view. The views are interleaved as produced and stored as electronic images which are converted into a depth image, such as a lenticular print.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Conventional methods of creating depth images assume that the image is being captured by photographic means. Photorealistic images can be generated by means of computer graphics. For the purposes of producing an image perceived as having depth the use of computer graphics offers significant advantages. The most obvious advantages are: the images are free of process variation, unlike any photographic method, and the objects within the images need not exist in reality, since they are simply computer models.

Since the 1970's computer graphics has been a method of generating photorealistic images (see J. Foley and A. VanDam, Fundamentals of Interactive Computer Graphics, Addison-Wesley, 1982). Since that time computer graphics have been used in entertainment, advertising, and scientific data analysis. Computer graphics software depends upon an underlying model of image formation which is comprised of surface material properties, the physics of light propagation and object construction. Common computer graphic models are loosely referred to as polygonal rendering, ray-tracing (see A. Glasner, Ray Tracing, Academic Press, 1989), radiosity (see Radiosity, Course Notes, SIGGRAPH 1991, Las Vegas) and geometric modeling (See Newman et al., Principles of Interactive Computer Graphics, McGraw-Hill, Inc. 1979). Each of these methods has advantages and limitations in achieving photorealism.

Once an image is composed, (i.e., all the lighting, geometry and surface models are determined) the position of the eye and the point it focuses on can be independently specified. As a result multiple views of the same image can be made by the graphics designer changing the viewpoint and view direction by rotating, shifting and enlarging or reducing the objects in the image. Since the resulting images are idealized and captured digitally, the problem of process variability disappears. The present invention further simplifies the process of selecting all the views for the graphics designer based upon considerations of the lenticular material, resolution of the printer and preferred ensemble arrangement of the virtual cameras. Once the user has described the characteristics of the printing devices and lenticular materials, then selection of a central view by the graphics designer is sufficient information for the present invention to determine automatically the remaining views, create the composite depth image file and provide the file to a printer.

The automatic aspect of the present invention results in the generation of the final print file targeted and optimized for the output printing device and the lenticular material. The convenience to the user results from the automatic selection by the present invention of the number of views, position of the cameras relative to the center location, the print resolution and the lenticular spacing. This provides the advantage of eliminating the need for the user to be concerned with technical details of producing a depth image. The system, however, provides a means for the user to override the automatic settings. Storage requirements are reduced by an efficient method of processing the plurality of temporary images sequentially and interleaving them directly into a final print file. The final print file storage approaches one gigabyte, i.e., one billion characters. Requiring the storage of the temporary image files as in the prior art nearly doubles the storage requirements. Computational resources are reduced by a more efficient method of sequencing the pixels in the temporary image files. Having the image being automatically transposed prior to rendering significantly reduces the processing time and system requirements. The prior art does not address this problem. (It should be noted that the transposition is not for printing convenience but for efficiently interleaving into the print file itself.)

Figure 1:
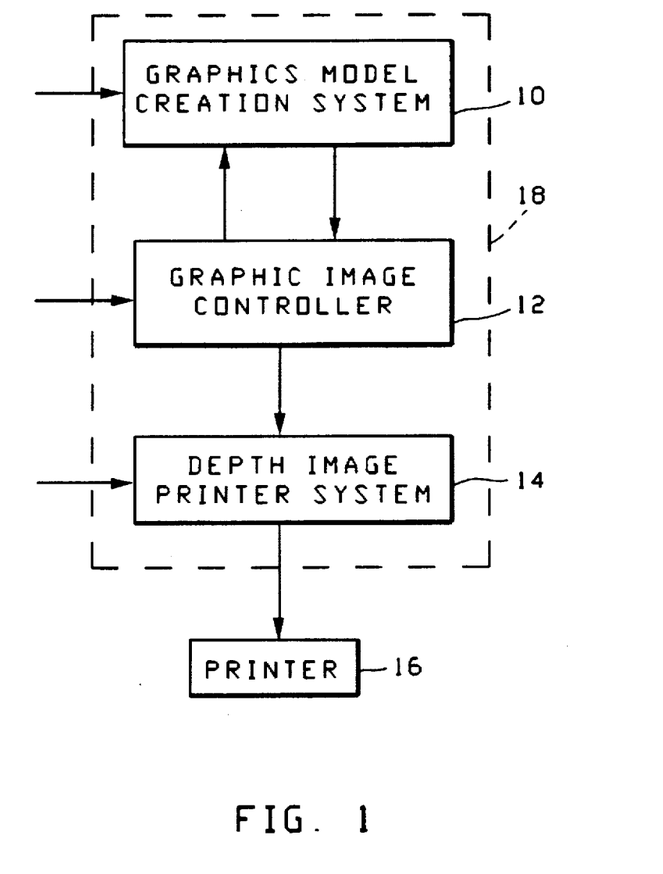
FIG. 1 illustrates the hardware and software of the present invention.

As illustrated in FIG. 1 the present invention comprises three primary processes or systems: a graphics model creation system 10, a controller 12 to manage the creation of the images needed for the depth image, and an image printer system 14 capable of producing the final depth image. With the graphics model creation system 10 a user (e.g., a graphics designer) creates a graphic model of a geometric object, such as a house. There are a large number of computer graphics systems which are suitable as the geometric model creation system 10, examples include WAVEFRONT available from Wavefront Technologies, ALIAS available from Alias Research Inc. and which operate on Silicon Graphics computers and MACRENDERMAN available from Pixar for an Apple Computer Inc.'s MACINTOSH computer. The preferred system is the RAYLIB system available from AT&T Pixel Machines and is designed to execute on AT&T Pixel Machine computer systems. The geometric model creation system 10 interacts with a graphics designer in a conventional way to create the geometric model of the object. Once the model is created and the user has selected a desired view of the object from which a depth image is to be created, a graphic image controller 12 controls the system 10 to automatically produce a sufficient number of left and right views on both sides of a selected central view with a pixel aspect ratio suitable for producing a stereoscopic or depth image, such as a lenticular print. The controller 12 can be implemented on the same computer system as the system 10, however, a window based system such as a workstation from SUN MICROSYSTEMS could also be used. The controller 12 will be discussed in more detail with respect to FIGS. 2–4 later herein. The images or views suitable for depth image creation are automatically transferred to the image printer system 14 which creates a depth image for a lenticular print and controls a printer 16 to produce a lenticular print of a geometrically created image. The printer system 14 has been described in detail in the related photography system application previously mentioned. The system 14 can be implemented using a window based computer system such as a system from SUN MICROSYSTEMS. The systems 10, 12 and 14 have been described above as being implementable on several different computer systems, however, as illustrated by the dashed line 18, the software systems are preferably executed in a computer system such as the AT&T Pixel Machine linked to a SUN workstation.

A number of means for printing have been devised for making hard copy representations of print files. One means used converts the print files to a video signal and displays the image on a cathode-ray-tube screen. This image in turn is imaged onto photosensitive material using an optical lens and an exposure made for the appropriate amount of time. A second method is to direct laser beams, modulated by the image information, onto a rotating polygon of plano optical facets which causes the reflected beam to scan across the photosensitive material repeatedly while the material is advanced slowly through this exposure gate. A third and preferred method for use in this invention, is electronic scan printing. In this method, red, blue, and green optical beams are combined by mirrors and beam-splitters into a single beam which is focused onto the photosensitive surface by a lens. The photosensitive surface, such as the emulsion layer on photographic film, is moved relative to the focused, combined beam as the optical power emitted from the lens is modulated in accordance with the print file. In some systems, the combination of red, green, and blue is accomplished by temporal sequence rather than optical combining, but the resultant is similar because exposure is cumulative.

Any of the above methods could be used for making a hard copy of the composite print file, but the preferred scan printing option offers the greatest control for scan line straightness and positional accuracy, both of which are necessary for accurate angular display of the information when placed behind a lenticular faceplate or overlay. Commercially-available electronic scan printers for use as printer 16 with accurate location of pixel printing include the McDonnell-Dettwiller Model 1000 and the preferred Eastman Kodak Co. LVT Model 1620A Image Recorder.

The present invention is primarily designed to produce a lenticular image or image with perceptible depth by the means of processing multiple images created from the computer graphics system 10. The number of views are designed to be sufficient to minimize noticeable transition artifacts between angular views given the constraints of possible printing methods and the lenticular material.

The system controller is used to remove many of the tedious steps between producing the geometric model and printing the final depth image. The controller can be used by the user to automatically produce a file suitable for printing, or the user may intervene to modify the process manually. The process of creating a final depth image from a computer graphic system typically requires the following steps: 1) Develop the scene model for the computer graphics system to render; 2) Establish the number of views and camera locations for each view; 3) Determine image size to take into account number of lenticules; 4) Reset the pixel aspect ratio; 5) Render each image separately and store in individual files; 6) Transpose the stored image; 7) If pixel aspect ratio is not reset, then resample image to account for physical limitations of lenticular material; 8) Interlace the images; and 9) Print image.

These steps are labor intensive, prone to error, and in some cases slow or unnecessary. The purpose of the this invention is for most of the above steps to be processed automatically and for a single image file to be constructed that is ready to be sent to a high-resolution printer. One method which can be used is to present the user with interactive windows which prompt the user when necessary, and have other options available, but set to default values.

Figure 2:
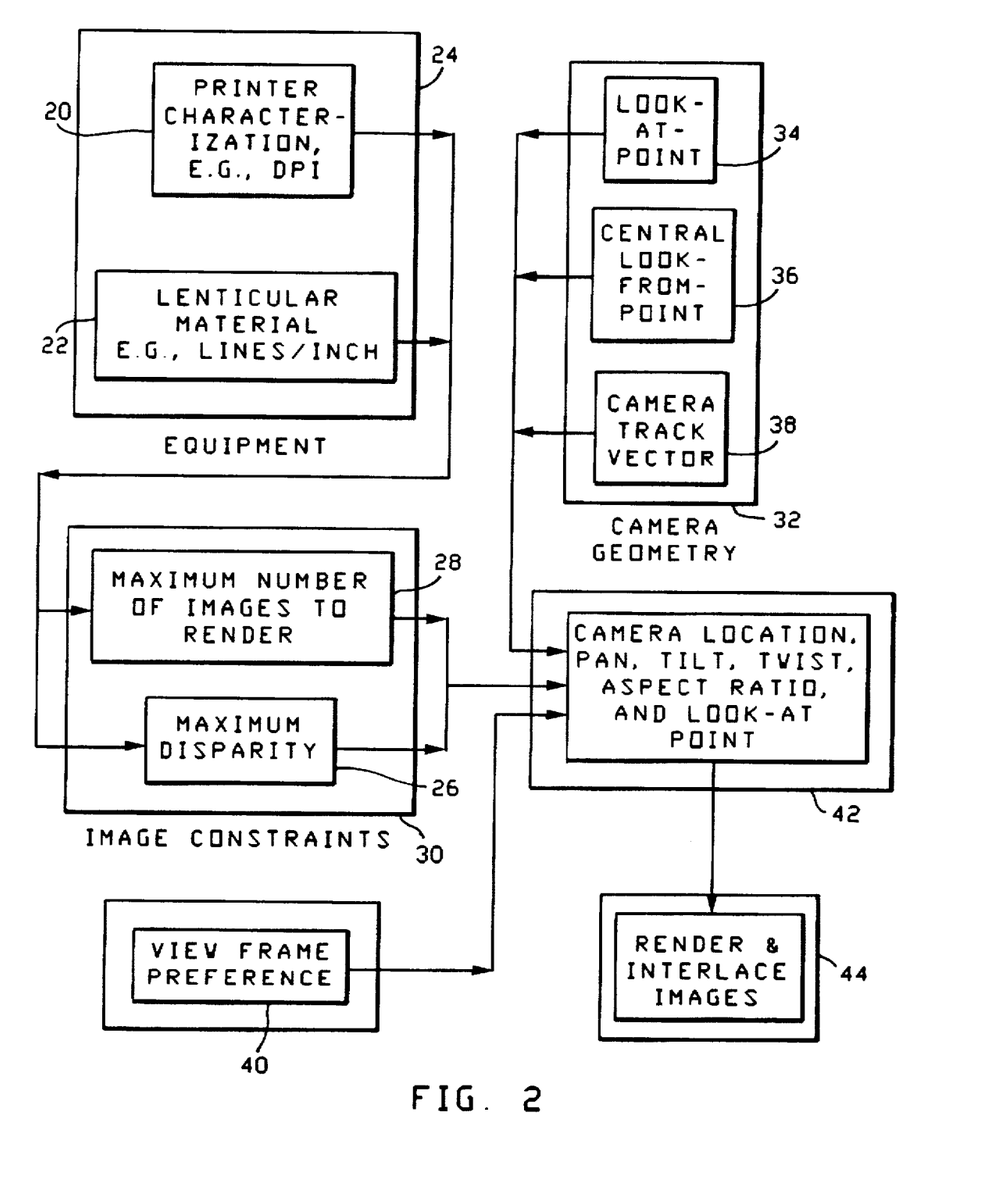
FIG. 2 depicts parameters and how they are combined to render an image.

A wide variety of image printers are available on the market today. The performance and specification of printers vary, and the choice of printers will vary the preferred selection of parameters for producing a depth image. Such parameters include, but are not necessarily limited to, resolution, maximum image size, color calibration and data formats. A change in the printer resolution for the same pitch of lenticular material will change the number of images that can be placed behind each lenticule. It is preferred that the system as illustrated in FIG. 2, have this printer characterization data 20 contained in a data base of printer specifications, the user is freed from considering the many minor, but important, details.

The choice of lenticular material is also a consideration when producing a depth image. The material specifications 22, coupled with the printer characteristics 20 will dictate the number of views that can be fit behind each lenticule. Indeed, if a material has a pitch of n lenticules/inch and a printer has a resolution of m dots/inch, then the maximum number of images that can be used is the largest integer less than or equal to m/n. Other important equipment type parameters that need to be considered are thickness of the lenticular material and the index of refraction of the material. These two considerations determine the optional location $\theta_m$ of virtual camera m. This follows from a basic application of Snell's law. The preferred angle relative to the central view line is:

$$\theta_m \cong (m-(M+1)/2)(n_l \Delta x/t) \quad (1)$$

wherein M is the number of images per lenticule, t is the thickness of the material, $\Delta x$ is the width of the image stripe (single or plural scan lines) and $n_l$ is the refractive index of the material which is nominally 1.5. Another consideration is the aspect ratio of pixels in the temporary image files as will be discussed with respect to equation (7). The change in aspect ratio is dictated by the number of temporary image files and the pixel shape of the output imaging device. The printer and material equipment considerations 24 are used to determine the recommended maximum disparity 26 and a resulting maximum track length 1 and the number 28 of images to render See Robert Akka, "Automatic Software Control of Display Parameters for Stereoscopic Graphics Images", vol 1669, Stereoscopic Displays and Applications, SPIE, presented February 1992 San Jose, Calif. and Okoshi, Takanori, Three-Dimensional Imaging Techniques, Academic Press, 1976 incorporated by reference herein and which describe how to determine the disparity from the closest object to the virtual cameras and the virtual camera positions. These image constraint values 30 may be overridden, though if the number of images is exceeded then the results may be unpredictable. Overriding the maximum disparity will present itself as satellite images which are often objectionable to the viewer.

Figure 3:
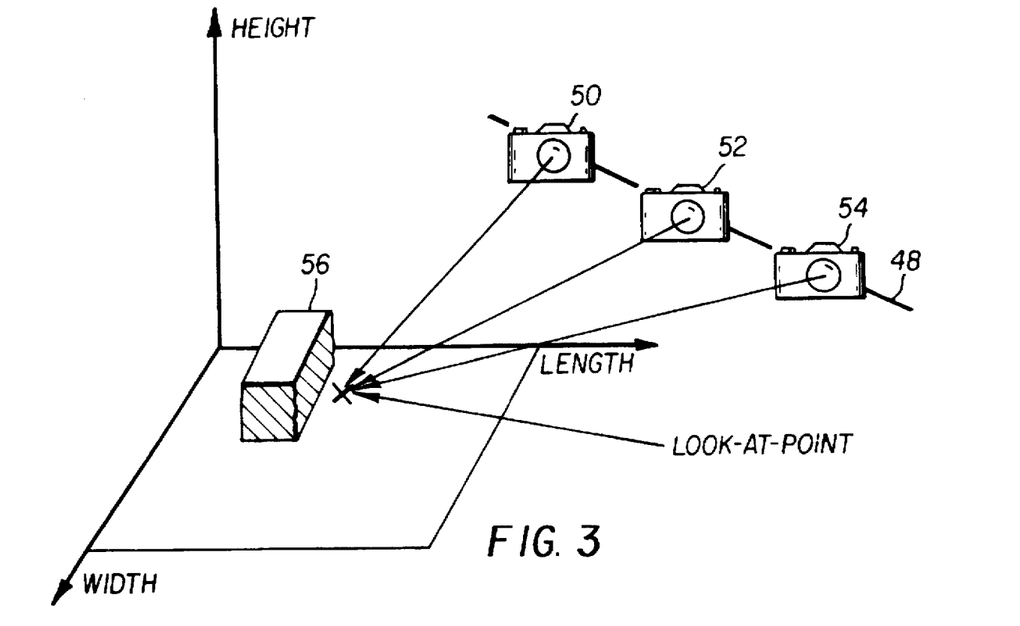
FIG. 3 illustrates geometric viewpoints of a geographically created geometric object.

The camera geometry inputs 32 refer to the preferred look-at-point 34 in the image and the look-from point, pan, twist and tilt of the center camera 36. The purpose of the center camera location, defined by the look from point, etc., is for the user to preview the rendered image prior to rendering the complete depth image. That is, the user defines the look-at and look from points by positioning the image of the desired geometric object 30 such that the view of the center camera is defined on the model creation display. These values are set to please the user's aesthetic sense. The camera track vector is a line on which hypothetical cameras will be set (See FIG. 3). Usually the camera track vector will be parallel to the x-axis and perpendicular to the vector defined by the line connecting the central look-from point and the look-at-point. As the viewing point transits across a depth image the viewer will often, if careful, observe a slight transition between views known as "flips", and he observes a large transition, known as a "jump", where the images appear to repeat. This phenomena is described by Okoshi mentioned above. The angle between jump points of the central or primary image is denoted $\theta_T$. The selection of this angle determines the number of discrete depths that may be resolved. In particular, as $\theta_T$ increases, the number of resolvable depths decreases. The effects of flipping can be reduced by either increasing the number of views, reduce $\theta_T$ or decrease the maximum depth of the objects. A preferred setting for $\theta_T$ is ten degrees, however, the user may modify the value as desired. The length of the camera track is determined by the angle of the primary image and is given by:

$$\text{Track length}=2 \cdot \text{distance (look-at-point-look-from-point) Sin } \theta_T \quad (2)$$

The view frame reference 40 refers to the perception of the objects relative to the image plane. The preferred relation is that the plane of zero parallax intersect the center of the object within the image. This results in a depth image that appears to extend both in front of and behind the image plane. While it is possible for the system to determine the closest and furthest point of an object relative to the central camera location, it is preferable to have the user select this by selecting the look-at-point of the central camera. To aid the user in determining the position of the plane of zero parallax the user, using conventional graphics system rendering capabilities, can render the scene with the back clipping plane set to contain the look-at-point, that is, only render objects in front of the image plane and another option to render the scene with the front clipping plane set to contain the look-at-point, that is, only render objects which extend behind the image plane.

Once the user accepts the camera locations the rendering process 44 begins and returns with a single file which is ready for the printer and lenticular material.

The environment modeled by the computer graphics system 10 consists of a series of identical hypothetical or virtual cameras which are conceptualized as being placed along a camera track or line 48. The hypothetical cameras or views 50, 52 and 54 are either all positioned so that the "look-at-point" for each camera or view is identical or the cameras focal axes are parallel as illustrated in FIG. 3. The position, twist, pan and tilt of each virtual camera may be altered by the user. The preferred manner of adjusting a camera is by a graphic icon. Each of the views is an output image produced by the graphics system 10 such as would be seen on a CRT monitor when the object 56 is rotated or shifted. The computer graphics system can provide either perspective projections or orthographic projections, the decision being made by the user. The location of the cameras or views are relative to the midpoint of the two end cameras or views and can be determined in accordance with $$p_k = f + (l(n_v - 2k + 1)/(2(n_v - 1))t \quad (3)$$

where f is the look-at-point, i.e., the location of the central camera, $p_k$ is the look-from location or point $(x_p, y_p, z_p)$, k is the number of the camera, $n_v$ is the number of views, l is the track length determined based the maximum track length and t is the track unit vector $(x_t, y_t, z_t)$. The look at points of each of the virtual cameras can all be set the same (at infinity) or the look at point can be determined using:

$$\text{Look at point}_k = a + l(n_v + 2k + 1)/2(n_v - 1)t \quad (4)$$

where vector a is the look-at-point of the virtual central camera.

The spacing between views (the positions of the cameras) is adjustable by the user. The camera line 48, as previously discussed is assumed to be parallel to the X-Y plane of the world-coordinate-system (See J. Foley and A. VanDam, Fundamentals of Interactive Computer Graphics, Addison-Wesley, 1982) although this is not necessary. Line 48 defined by the views, the line from the look-at-point and the center of the camera positions are normal, i.e., perpendicular.

The number of views depends upon the pitch of the lenticular material, and the resolution of the output printer. The maximum number of views $(n_v)$ being:

$$\text{views} = \frac{\text{Printer Resolution}}{\text{Lenticular Pitch}} = \frac{\frac{\text{dots}}{\text{inch}}}{\frac{\text{lenticules}}{\text{inch}}} = \frac{\text{dots}}{\text{lenticule}} \quad (5)$$

The number of views may be less than the maximum for unspecified reasons. In these cases the missing views may be replaced by black or unexposed pixels, and in some cases this modification improves the perceived image quality. In creating a synthetic or a imaginary geometric image the computer graphics artist will build an image iteratively and adjust model parameters such as object location, shape, surface characteristics, lighting and viewpoint. This is typically done on a single image with the viewpoint being relative to the center camera location.

Figure 4A:
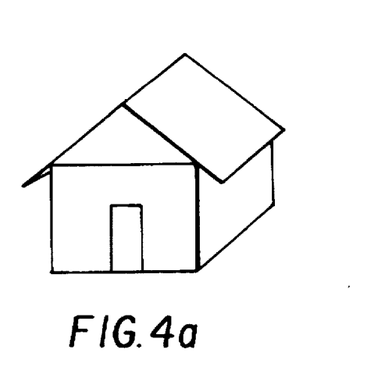
FIGS. 4a–4b illustrate two views of a geometric object.
Figure 4B:
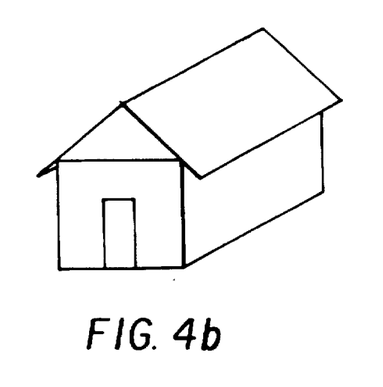

Once the user is satisfied with the image generated, the system will then proceed to generate an image from each view location to imitate the procedure of taking a series of photographs, as illustrated in FIGS. 4(a) and 4(b) which shows two of plural images generated. To initiate this the user must provide or accept automatically determined information about the number of cameras or views, the direction of the line of virtual cameras, and the spacing between views. The system can then generate the image for each view automatically by rotating or shifting the image along the camera line by the amount specified between views for the number of views on each side of a designated center view. The user could alternatively perform the rotations manually by interacting with the graphics system 10 to rotate or shift the images by the desired amounts on both sides of the desired center view. Further, the user may input the printer resolution and the lenticular pitch and spacing between cameras and have the system determine the number of views from equation (3). After each graphics image for a view is generated it is captured from the output device and stored in a temporary image file (not shown in the drawings). In the preferred embodiment, this is initiated by the "raysave" command in the RAYlib library of the AT&T Pixel Machine being activated by the controller 12.

To modify a graphics system image to be suitable for a lenticular image generator requires a modification to the manner of storing the individual computer graphics images. If the final image is to have a proper aspect ratio, i.e.,:

$$\text{Aspect} = \frac{\text{Horizontal Image Distance}}{\text{Vertical Image Distance}} \quad (6)$$

where the horizontal and vertical image distances are the height and width. Assuming the digital printer outputs pixels in a rectilinear matrix with interpixel spacing being $\Delta_v$ in the vertical direction and $\Delta_h$ in the horizontal direction, the aspect ratio of the computed images must be modified to maintain the resulting image size. The effective aspect ratio that the computer graphic system 10 has to produce is given by:

$$\text{Pixel Aspect Ratio} = \frac{\Delta_v}{\Delta_h \text{Views}} \cdot \text{Aspect} \quad (7)$$

where Views is the number of images to $(n_v)$ be processed. For example, if the interpixel spacing, $\Delta_v = 0.01$ and $\Delta_h = 0.01$ and Aspect=1.2, then for 12 views the pixel aspect ratio must be 0.1. This indicates that the image to be used for the lenticular print composition appears as if it is foreshortened by a factor of ten in the horizontal direction. When this foreshortened image view is combined with the other views, the proportions of the graphics object as viewed (the object view proportions) match the proportions of the original graphic object. This operation can be performed by most computer graphic systems when computer aspect is provided as an input to a subroutine, for example, in preferred RAYLIB™ system the proper subroutine is RAYpersp__project.

In capturing the image as a computer file, the typical image storage method is to store the image horizontally sequenced. Since the lenticular ribs or lenses are oriented vertically and the images for each view must be interlaced, the capture orientation is perpendicular compared to the print orientation. While this does not present a fundamental limitation, it is inefficient since the captured images must be transposed to efficiently interlace the various views to be oriented in the same direction as the lenticular material. To remedy this problem before the images are captured (rendered and transferred to a storage media, such as a disk), a 90° image rotation of the view is performed. This rotation function is common to most computer graphics systems and can be provided by the preferred system. The result is that the image captured is aligned with the orientation of the lenticular lenslets.

In the preferred embodiment, upon completion of the storage of a temporary individual view file, it can be immediately merged into the final image file by interleaving. The view file can then be deleted. This process requires less file storage space than simultaneously storing all the individual view files and creating the final image file from the stored files during an interleaving process as is done in the prior art. For a final image file consisting of n views, the ratio of file storage requirements by the present invention versus the prior art are 2n versus n+1. For a typical file consisting of 12 views, the memory storage requirements of the present invention would be 13/24 or less than 55% of the convention interleaving approach. The present invention constructs the final image file by taking consecutive rows of pixels from the temporary image view file and placing them either next to each other in the final image file if they are to appear under the same lenticule when printed or spaced apart by the number of rows required in the final image file to put the temporary image file row under the next lenticule. Suppose the final image is to be comprised of k images, with the print size of the composite image being n×m pixels (n is an integral multiple of k) The images are indexed relative to the position of the respective virtual camera, i.e., leftmost image is denoted $I_l$ and the rightmost image is denoted $I_k$. Each image $I_j$, (j=l, ....k) has (n/k)×m pixels. Because the image is rotated as described above the rendered image is referenced as an m×(n/k) image. The $p^{th}$ row of this image (either a single scan line or multiple scan lines if multiple scan lines comprise an image line) is stored in the k(i−1)+(k−i)+1 row of the final image file. This final image file is used by the printer to produce the image to be placed under the lenticular material.

Figure 5:
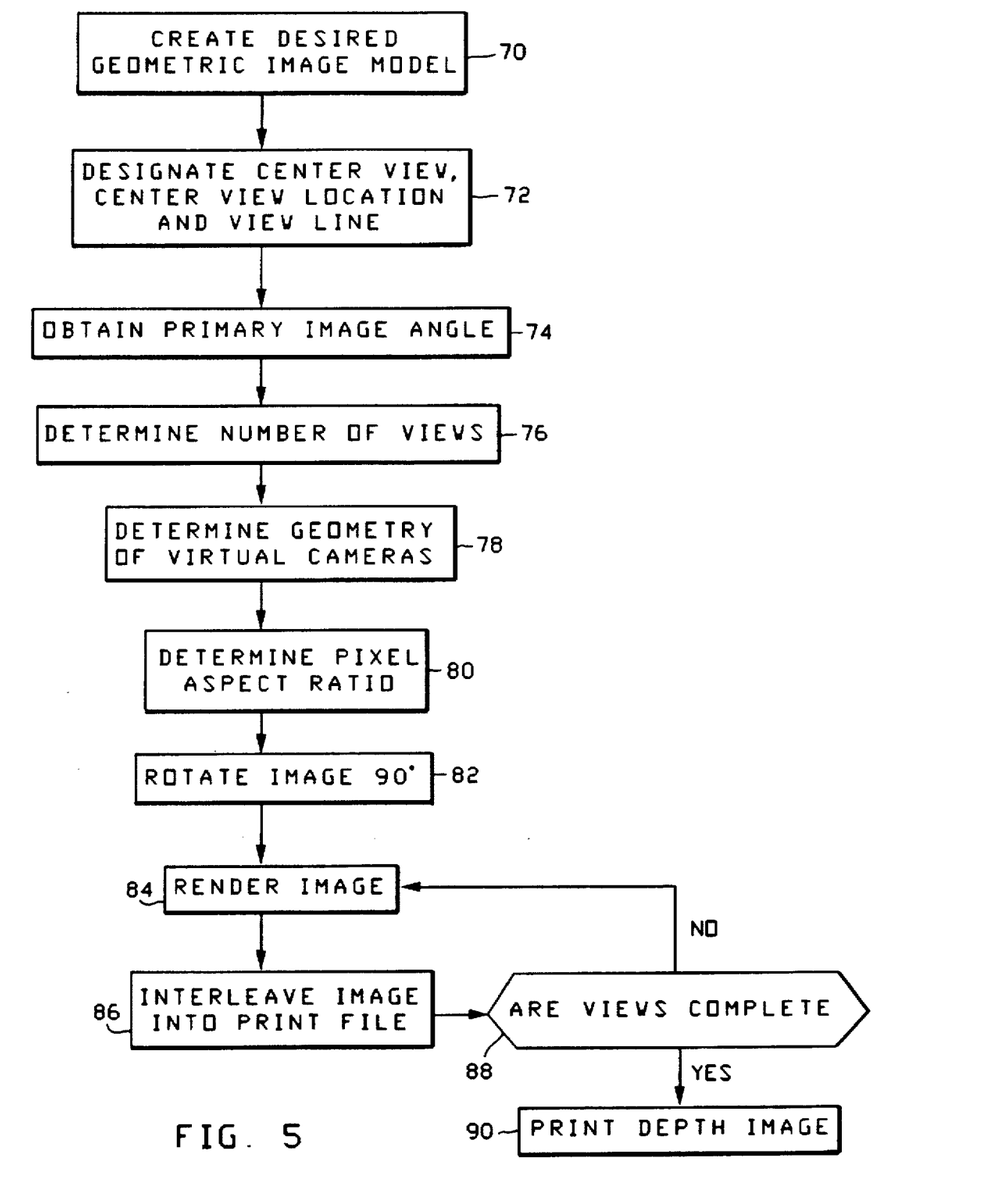
FIG. 5 depicts the steps performed in the process of the present invention.

The present invention takes advantage of the particular subroutine execution capability of the preferred RAYlib graphics system in automatically creating the views. More particularly the controller 12 performs a calculation, such as determining the pixel aspect ratio, and uses the calculated value as one of the parameters of a subroutine call that performs the desired function. As illustrated in FIG. 5 the present invention starts by the graphics designer/user creating 70 the desired geometric or graphics image. The user then designates 72 the look-from-point by positioning the display image (view) at the desired center camera position. The primary image angle is designated 74 and the number of views is determined 76 as previously discussed. The user can also designate the look-at position or it can be calculated as previously discussed. Since the view line is designated as perpendicular to the line between the look-at and look-from points and in the x direction, this also designates the view line, unless a different view line has been previously designated in step 72. Other defaults such as the view pointing direction (straight ahead or view point convergent) can also be changed. The view line length is determined from the maximum disparity or other considerations of the user and the camera positions are determined. The geometry or view positions of the virtual cameras as previously discussed is then determined 78. Next, the pixel aspect ratio is determined 80 and the appropriate subroutine is called. The rendering system automatically changes 82 the twist of the camera by 90 degrees based on a previously set subroutine parameter. The first image is created (rendered) 84 using the camera position, look-at-point and the results of the subroutine executions. The resulting image is and stored in a temporary image file. The temporary image is interleaved 86 into the final image file. The temporary image file contents can now be deleted. If the number of images is sufficient 88 then the print file is complete, otherwise the next view is rendered 84 using a new camera position etc. Finally, the print file is transferred to a printer and the depth image is printed 90. It is preferable that at least 12 views/images and more preferably as many views/images as possible be used to improve the depth resolution of the depth image. The printed image is combined with a lenticular overlay to create the final depth image print.

The present invention provides the advantage of complete image control over all aspects of the image system. Each pixel value can be computed to the precision providable by the computer graphics system 10. The present invention eliminates variations in film processing, differences in camera optics and other sources of image degradation which introduce inaccuracies in the depth image. The present invention also allows depth picture creation from images which arise in the pure imagination of the artist as long as the images can be modeled by a computer graphics system.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the technique can be used to create barrier or integral type depth images. In cases where the user specifies values in excess of the system norms, the system can warn the user by either a warning message or warning dialog box. For example, a user defined camera track length may cause the resultant image to have a disparity exceeding recommended tolerances. The computer could provide some warning, such as "Camera track length exceeds nominal length—Reduce track length". The invention has been described with respect to determining parameters for graphic system subroutines and then executing those subroutines to effect different graphic functions. Other methods of control are possible, for example, the calculations can be performed and a list of parameters prepared from which commands can be prepared and issued to the graphics system. The list could also be used in batch processing operations.

What is claimed is:

1. A method of creating an integral image in a computer system, comprising the steps of:
   (a) creating a graphic model of an object using the computer system;
   (b) automatically determining in the computer system the number of views of the graphic object based upon pitch of the lenticular material and printer resolution and producing at least three perspective views of the graphic object; and
   (c) producing in the computer system an integral image from the at least three views, wherein the step of producing at least three perspective views of the graphic object in step (b) comprises:
     (b1) rendering each perspective view of the at least three perspective views: and
     (b2) interleaving the at least three perspective views to create a composite image, wherein the step of interleaving the at least three perspective views to create the composite image is accomplished by sequentially processing and interleaving each perspective view of the at least three perspective views directly into the composite image.

2. A method according to claim 1 wherein the integral image is a lenticular image.

3. A method of creating an integral image in a computer system, comprising the steps of:
   (a) creating a graphic model of an object using the computer system;
   (b) automatically producing in the computer system perspective views of the graphic object; and

13

(c) producing in the computer system an integral image from the views, and wherein step (b) comprises:
  (b1) automatically determining in the computer system the number of views of the object based upon pitch of the lenticular material and printer resolution;
  (b2) rendering and storing each of the views; and
  (b3) interleaving the stored views creating a composite image, wherein the step of interleaving the stored views to create the composite image is accomplished by sequentially processing and interleaving each stored view directly into the composite image upon storing each view.

4. A method according to claim 3 wherein the integral image is a lenticular image.

5. A method of creating a lenticular image in a computer system, comprising the steps of:
  (a) creating a graphic model of an object using the computer system;
  (b) automatically producing in the computer system perspective views of the graphic object; and
  (c) producing in the computer system a lenticular image from the views, and wherein step (b) comprises:
    (b1) rendering a view; then
    (b2) interleaving the rendered view into the lenticular image, wherein the step of interleaving the rendered view into the lenticular image is accomplished by sequentially processing and interleaving the rendered view directly into the lenticular image; then
    (b3) repeating steps (b1) and (b2) for further views of the graphic object.

6. A method of creating a lenticular image, comprising the steps:
  (a) creating a graphic model of an object using a computer system;
  (b) automatically producing in the computer system, perspective views of the graphic object; and
  (c) producing in the computer system a lenticular image from the views, and wherein step (b) comprises:
    (b1) designating a center of a view line along which views are to be rendered;
    (b2) determining a number of views based upon lenticular pitch and printer resolution;
    (b3) determining view positions from the center of the view line and number of views;
    (b4) rendering the views in accordance with the view positions; and
    (b5) interleaving the views into the lenticular image, wherein the step of interleaving the views into the lenticular image is accomplished by sequentially processing and interleaving each view directly into the lenticular image.

7. A method as recited in claim 6, wherein step (b3) comprises a user designating the view positions.

8. A method as recited in claim 6, wherein step (b2) comprises determining a maximum number of views in accordance with:

Number of Views=Printer Resolution/Lenticular Pitch.

9. A method as recited in claim 6, wherein view positions are determined from the number of views and a track length defining separation between end views.

10. A method as recited in claim 9, wherein the track length is determined from a distance between a look-at-point and a look-from-point and an angle between the end views.

11. A method of creating a lenticular image, comprising the steps of:
  (a) creating a graphic model of an object using the computer system;

14

(b) automatically producing in the computer system perspective views of the graphic object, wherein the step of automatically producing in the computer system perspective views of the graphic object comprises:
    (b1) rendering each perspective view of the perspective views; and
    (b2) interleaving the perspective views to create a composite image, wherein the step of interleaving the perspective views to create the composite image is accomplished by sequentially processing and interleaving each perspective view of the perspective views directly into the composite image; and
  (c) producing in the computer system a lenticular image from the views, including step (c1) foreshortening the views by altering a rendered pixel aspect ratio to obtain a desired pixel aspect ratio, C, of the depth image in accordance with:

$$C=(ISV*HD)/(NV*ISH*VD)$$

where: HD is the width of the lenticular image and VD is a height of the lenticular image, ISV is printer vertical interpixel spacing, ISH is the printer horizontal interpixel spacing and NV is the number of views.

12. A method as recited in claim 11, wherein step (c1) includes:
  (ci) determining a desired image aspect ratio A in accordance with:

$$A=HD/VD$$

where HD is the width of a depth image and VD is a height of the depth image; and
  (cii) determining a pixel aspect ratio C in accordance with $$C=(ISV*HD)/(NV*ISH*VD)$$

where ISV is printer vertical interpixel spacing, ISH is the printer horizontal interpixel spacing and NV is the number of views.

13. A method of creating a lenticular image in a computer system, comprising the steps of:
  (a) creating a graphic model of an object using the computer system;
  (b) automatically producing in the computer system perspective views of the graphic object; and
  (c) producing the lenticular image from the views, and wherein step (b) includes:
    (b1) rotating the views 90° prior to outputting;
    (b2) rendering each perspective view of the perspective views; and
    (b3) interleaving the perspective views to create a composite image, wherein the step of interleaving the perspective views to create the composite image is accomplished by sequentially processing and interleaving each perspective view of the perspective views directly into the composite image.

14. A method of creating an integral image in a computer system, comprising the steps of:
  (a) creating a desired graphic model of the object in the computer system;
  (b) designating a center view location for a center of a viewing region;
  (c) determining a primary image angle between repetitions of the image from different perspectives;
  (d) automatically determining in the computer system, the number of views of the graphic object based upon pitch of the lenticular material and printer resolution;

(e) determining view positions;

(f) determining a pixel aspect ratio;

(g) rendering an image responsive to steps (a)–(g);

(h) interleaving the rendered image in a composite image, wherein the step of interleaving the rendered image into the composite image is accomplished by sequentially processing and interleaving the rendered image directly into the composite image;

(i) repeating steps (g) and (h) for further views of the graphic object to obtain a composite image;

(j) printing the composite image; and (k) attaching a lenticular overlay to the printed image.

15. A computer system for creating integral images, comprising:

geometric model image creation means for creating a geometric model in the computer system; and integral image creation means for automatically creating in the computer system at least three perspective views of the model and creating an integral image from the at least three perspective views, the total number of views of the model creating being automatically determined by the computer system based upon pitch of the lenticular material and printer resolution, wherein the integral image creation means comprises:

means for rendering each perspective view of the at least three perspective views; and means for interleaving the at least three perspective views to create a composite image, wherein the step of interleaving the at least three perspective views to create the composite image is accomplished by sequentially processing and interleaving each perspective view of the at least three perspective views directly into the composite image.

16. A system according to claim 15 wherein the system creates lenticular images.

17. A system for creating a lenticular image, comprising:

a graphics system used by a user to create a graphic image of an object and designate a preferred viewpoint;

means for controlling the graphics system to produce perspective views of the object; and means for producing the lenticular image from the views, comprising:

means for designating a view line along which the views are to be rendered responsive to a center view and a center view location specified by a user;

means for determining a number of views each with a different visual perspective from display resolution and lenticular pitch;

means for determining a pixel aspect ratio responsive to the number of views, interpixel spacing and horizontal and vertical image distances;

means for rendering views rotated by 90° responsive to the view line, center view, center view location, number of views and pixel aspect ratio; and means for interleaving the rendered views to create a composite image, wherein the step of interleaving the rendered views to create the composite image is accomplished by sequentially processing and interleaving each view of the rendered views directly into the composite image.

18. A method of creating a lenticular image, comprising the steps of:

(a) creating a graphic model of an object using a graphics system;

(b) automatically producing perspective views of the graphic object, wherein the step of automatically producing perspective views of the graphic object comprises:

(b1) rendering each perspective view of the perspective views; and (b2) interleaving the perspective views to create a composite image, wherein the step of interleaving the perspective views to create the composite image is accomplished by sequentially processing and interleaving each perspective view of the perspective views directly into the composite image; and (c) producing the lenticular image from the views, including step (c1) foreshortening the views by altering a rendered pixel aspect ratio to obtain a desired pixel aspect ratio of the lenticular image;

wherein step (c1) includes:

(ci) determining a desired image aspect ratio A in accordance with:

$$A = HD/VD$$

where HD is the width of a depth image and VD is a height of the lenticular image; and (cii) determining a pixel aspect ratio C in accordance with $$C = (ISV*HD)/(NV*ISH*VD)$$

where ISV is printer vertical interpixel spacing, ISH is the printer horizontal interpixel spacing and NV is the number of views.

* * * * *